(12) United States Patent
Ranganath et al.

(10) Patent No.: US 8,060,402 B1
(45) Date of Patent: Nov. 15, 2011

(54) PRIVACY-SENSITIVE COOKIES

(75) Inventors: Rama Ranganath, San Francisco, CA (US); Narayanan Shivakumar, Kirkland, WA (US); Deepak Jindal, San Francisco, CA (US)

(73) Assignee: Google Inc., Mountain View, CA (US)

( * ) Notice: Subject to any disclaimer, the term of this patent is extended or adjusted under 35 U.S.C. 154(b) by 534 days.

(21) Appl. No.: 12/102,622

(22) Filed: Apr. 14, 2008

Related U.S. Application Data (60) Provisional application No. 60/911,861, filed on Apr. 13, 2007.

(51) Int. Cl.
*G06Q 30/00* (2006.01)
*G07G 1/14* (2006.01)
(52) U.S. Cl. .......................................................... 705/14
(58) Field of Classification Search .................. 705/1–45
See application file for complete search history.

(56) References Cited

U.S. PATENT DOCUMENTS

| | | | |
|---|---|---|---|
| 2003/0050863 A1* | 3/2003 | Radwin ........................... 705/27 |
| 2003/0078928 A1* | 4/2003 | Dorosario et al. .............. 707/10 |
| 2004/0024632 A1* | 2/2004 | Perry ............................... 705/10 |
| 2004/0215515 A1* | 10/2004 | Perry ............................... 705/14 |
| 2005/0033641 A1* | 2/2005 | Jha et al. ......................... 705/14 |
| 2007/0239537 A1* | 10/2007 | Protheroe et al. ............... 705/14 |

* cited by examiner

*Primary Examiner* — Rajesh Khattar
(74) *Attorney, Agent, or Firm* — Fish & Richardson P.C.

(57) ABSTRACT

Methods, systems and apparatus, including computer program products, for generating cookies. Multiple advertisements for multiple advertisers are stored on an ad server. Hostnames specific to each of the multiple advertisers are generated dynamically. The generated hostnames identify the ad server. A reference is generated identifying a particular advertisement of the multiple advertisements and the ad server. The ad server is identified in the reference with the generated hostname associated with the advertiser of the advertisement. The reference is provided to a client. A request is received from the client for the advertisement. The request includes the generated hostname. In response to the request, a client cookie, which includes a unique identifier, is sent to the client.

23 Claims, 3 Drawing Sheets

PRIVACY-SENSITIVE COOKIES

CROSS-REFERENCE TO RELATED APPLICATIONS

This application claims the benefit under 35 U.S.C. §119 (e) to U.S. Provisional Application Ser. No. 60/911,861, filed on Apr. 13, 2007, which is incorporated here by reference.

BACKGROUND

This specification relates to cookies that can be used to identify a client or user in Internet interactions.

Generally, the term "cookie" is used to refer to HTTP (Hypertext Transport Protocol) or web cookies. However, the term will be used in this specification in a broader sense to include any collection of information, whether stored in a file or otherwise, provided by a web site to be stored on a client device. Generally, a cookie includes information about an individual's or the client's use of a web site. Thus, the term includes not only conventional web cookies but also other technologies, e.g., "Local Shared Objects," which are also known as "Flash cookies."

When an advertisement is downloaded from an ad server by a user's browser, a cookie, associated with the ad server, is provided by the ad server to the browser. The cookie can be used to track how many unique browsers have downloaded the advertisement and how many times the advertisement has been downloaded by any one user's browser. An advertiser can incorporate content from the ad server into a conversion page. When the user visits the advertiser's conversion page, the information in the cookie is provided to the ad server when the content is downloaded by the user's browser.

Ad servers often serve multiple advertisements for a variety of advertisers. Conventionally, a single cookie associated with the ad server is used to track and identify a user with respect to all advertisements served by the ad server. Instead of using cookies, some ad servers record and track a user based on the user's IP (internet protocol) address and browser agent identity.

SUMMARY

In general, one aspect of the subject matter described in this specification can be embodied in methods that include the actions of storing multiple advertisements for multiple advertisers on an ad server; dynamically generating hostnames specific to each of the multiple advertisers, the generated hostnames identifying the ad server; generating a reference identifying a particular advertisement of the multiple advertisements and the ad server, the ad server being identified in the reference using the generated hostname associated with the advertiser of the advertisement; providing the reference to a client, the generated hostname of the reference being usable by the client to identify the ad server; receiving on the ad server a first request for the advertisement from the client, the first request including the generated hostname; and in response to the first request, sending to the client a client cookie including a unique identifier. Other embodiments of this aspect include corresponding systems, apparatus, and computer program products.

These and other embodiments can optionally include one or more of the following features. The method includes receiving a second request from the client, where the second request includes the client cookie and in response to the second request, recording the second request including the unique identifier of the client cookie. The method further includes recording the first request and the unique identifier and using the recorded second request to derive advertising metrics for the advertiser associated with the generated hostname identified in the first and second request.

The method further includes providing the reference to a publisher for the publisher to incorporate into published content to be provided to the client by the publisher. The reference is a universal resource locator. The method includes, in response to the first and second request, sending to the client the advertisement requested by the client. The client cookie is sent by the client in all subsequent requests that include the generated hostname. Sending to the client the client cookie includes identifying for the client the particular advertiser associated with the cookie and receiving a user input specifying whether or not the cookie from that particular advertiser is accepted.

Particular embodiments can be implemented to realize one or more of the following advantages. Web browsers normally limit each hostname to a fixed number of cookies (e.g., 20 cookies). This limitation can be overcome by dynamically creating new hostnames with which to associate cookies. Cookies can be associated with individual advertisers so that users are identified on a per-advertiser basis (or per-campaign or other basis), thus helping to protect the privacy of the user. Users can accept or reject cookies from specific advertisers rather than the entire ad server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
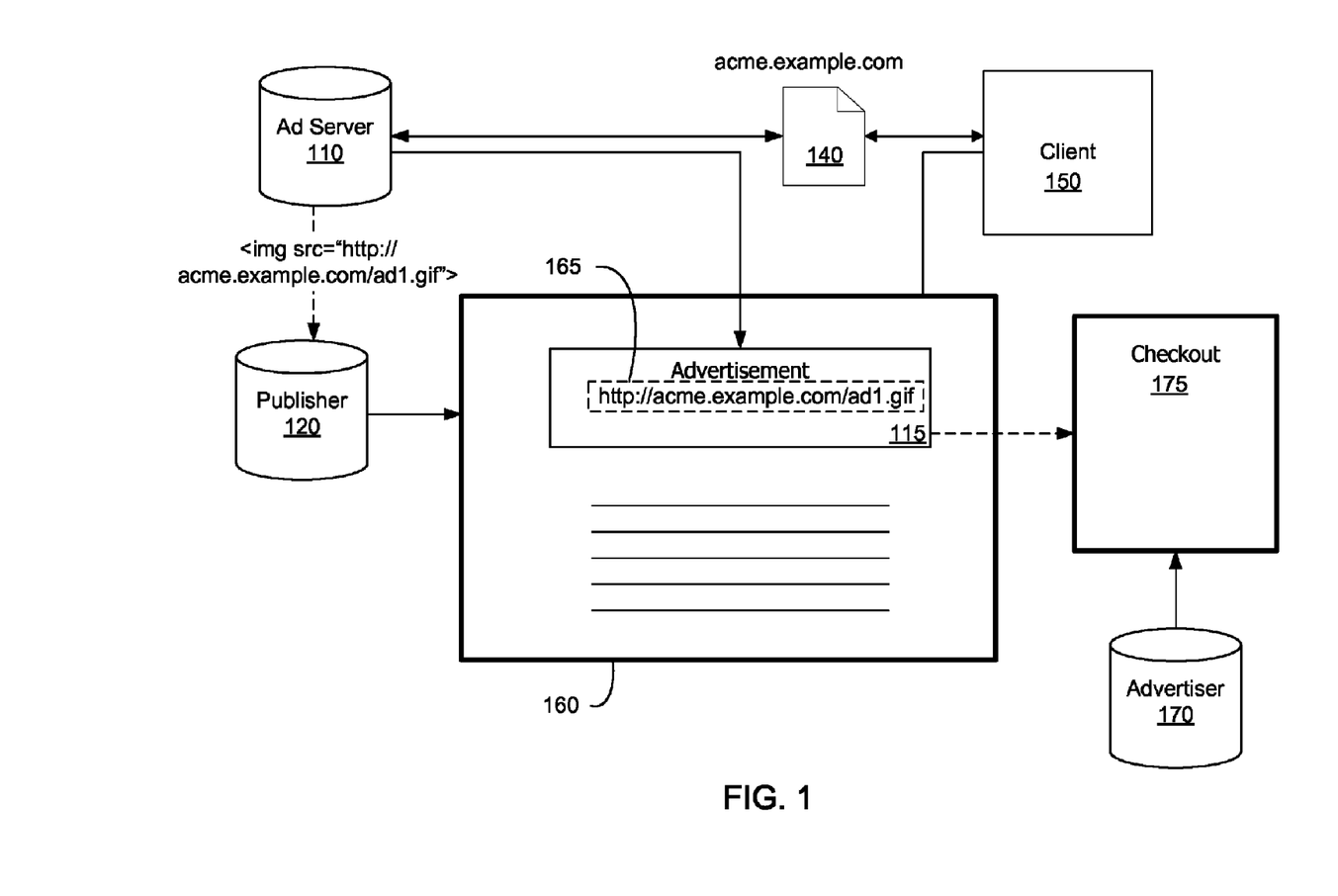
FIG. 1 is a diagram illustrating interactions among an example ad server, an example publisher and an example client.

FIG. 1 is a diagram illustrating interactions among an example ad server 110, an example publisher 120 and an example client 150. Although a single ad server is referred to in the following description, the ad server can be implemented as a system of one or more servers (e.g., a load-balancing server farm or cluster) that includes varying server components (e.g., web servers and DNS (domain name system) servers. An ad server 110 hosts advertisements that can be provided to publishers 120 of web content. Advertisements can include images, text, multimedia, scripts or a combination thereof.

A publisher 120 provides published content of its own (e.g., information, news, web logs or web services), but can also incorporate third-party content, typically advertisements, which are hosted on a third-party sever, typically the ad server. Generally, when an advertisement is provided to the publisher 120, the publisher 120 is provided with a reference to the advertisement hosted on the ad server 110. The reference can be a universal resource locator (URL), which includes a hostname identifying the ad server and a particular advertisement (e.g., 'http://acme.example.com/ad1.gif'). The publisher incorporates the advertisement into published content by including the reference in the published content.

The published content 160, including the reference 165, is received by a client 150 (e.g., a web browser). For example, the published content 160 can include hypertext markup language (HTML) text having the reference 165. When the HTML is parsed by the web browser, the reference 165 is identified as content to be retrieved. Alternatively, in some implementations, the published content 160 includes one or more scripts (e.g., JavaScript), which, when executed, identifies the reference 165 as content to be retrieved. Other suitable techniques can be used for including or identifying a reference within the published content 160. The client uses the reference 165 to request and download the advertisement 115 from the ad server 110. The client typically renders and displays the published content 160, including the advertisement 115, to a user. The advertisement itself may address (i.e., include a link to) another location independent of the ad server 110. For example, a user clicking on the advertisement can cause the client to navigate to another page 175 provided, for example, by the advertiser 170.

The first time a client downloads content from the ad server, the ad server provides a cookie 140, which includes a unique identifier, to the client 150. The content of the cookie is stored by the client. In general, web browsers prevent servers from storing arbitrarily large amounts of information in a single cookie or associating many (e.g., more than 20 or 50) separate cookies with any particular hostname.

Despite these limitations, a system implementing the techniques described in this specification can afford users fine-grained privacy protection by associating separate cookies, each with unique identifiers, with separate advertisers. The granularity of privacy can vary among implementations. For example, a cookie and its unique identifier may be associated with individual ads, individual advertising campaigns, individual advertisers or some other convenient entity representing a collection of advertisements or other third-party content. To associate cookies with each entity, hostnames are dynamically generated for each entity.

Figure 2:
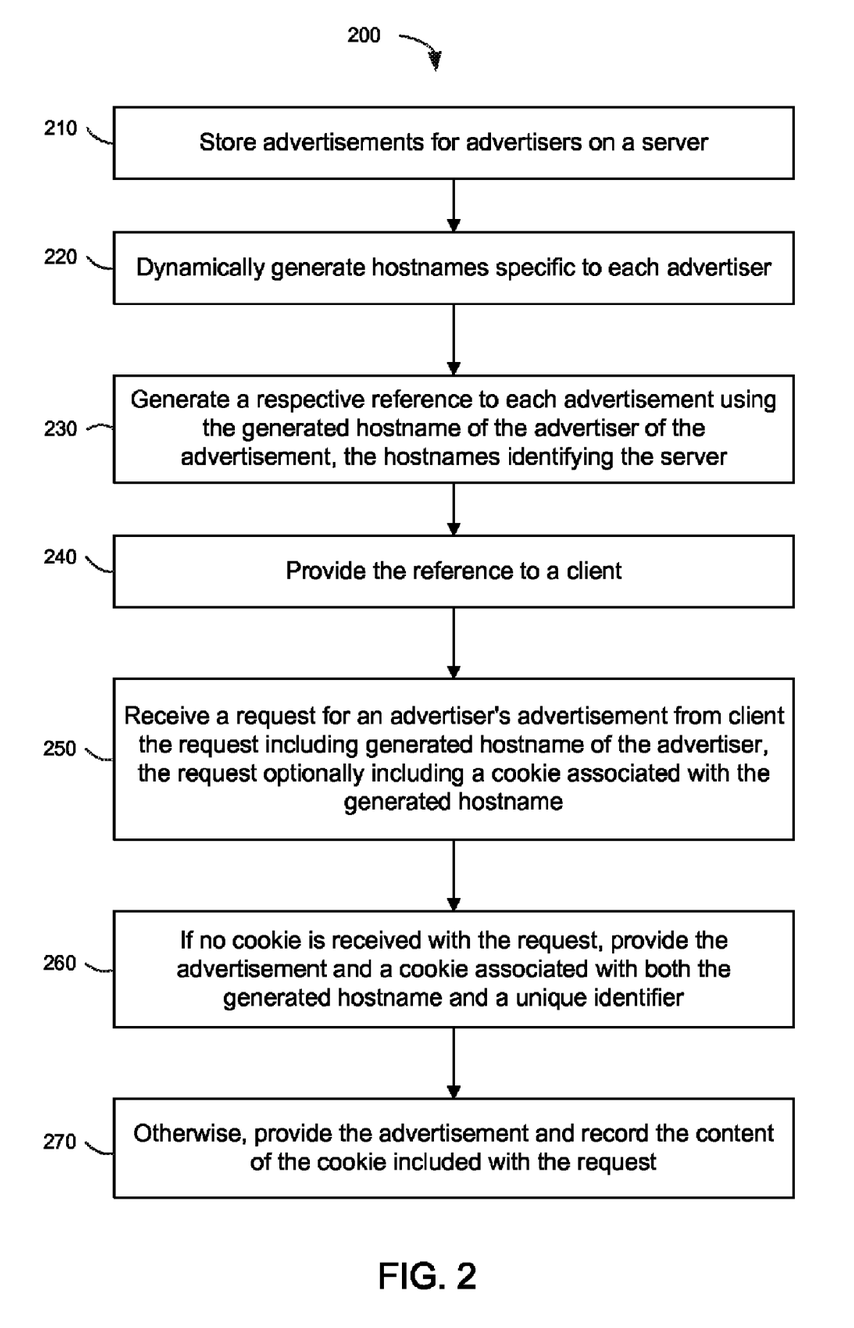
FIG. 2 is a diagram of a process for generating per-advertiser hostnames.

FIG. 2 is a diagram of a process 200 for generating per-advertiser hostnames. Several advertisers and their advertisements, which are generally stored and hosted by the ad server, are identified (step 210). Hostnames are dynamically generated for each advertiser (step 220). Hostnames can be generated based on information about the advertiser (e.g., a name or other identifier). In some implementations, the dynamically generated hostname is a sub-domain of the ad server's domain name. For example, if the domain name of the ad server is adserver.example, then sub-domain may be advertiser1.adserver.example or advertiser3.adserver.example. In other implementations, the dynamically generated hostname is a domain name (e.g., adv1server.example or adv2server.example). Typically, however, all of the dynamic hostnames identify the ad server. For example, the client would resolve both advertiser1.adserver.example and advertiser3.adserver.example to an IP (internet protocol) address of the ad server.

The dynamically generated hostname associated with each advertiser is used when generating references to particular advertisements of the advertiser (step 230). Each reference includes the generated hostname rather than the conventional hostname of the ad server. For example, if Acme Company is associated with the dynamically generated hostname 'acme.adserver.example', then a reference to an advertisement for Acme Company may be 'http://acme.adserver.example/summersale.gif'. The references are provided to a publisher.

Typically, the publisher incorporates the reference in published content. The published content, including the reference, is downloaded and received by clients. Thus, the reference is provided to a client (step 240). The client uses the reference to request the advertisement from the ad server. In general, using the reference includes resolving an IP address based on the hostname, in particular the dynamically generated hostname, specified in the reference.

Hostname resolution can be carried out by the client in accordance with any pre-determined process (e.g., DNS address resolution). Resolving the dynamically generated hostname can include requesting IP address resolution from a server associated with the domain name portion of the hostname. For example, to resolve acme.adserver.example the server at adserver.example can be requested to provide an IP address. In some implementations, the ad server, or more generally a component of the ad server system, can respond to such requests. The ad server can respond to all requests for all dynamically generated hostnames that could potentially be generated (e.g., '*.adserver.example'), including hostnames that have not yet been generated or associated with an advertiser. For example, the hostname noone.adserver.example can be resolved to a particular IP address, even if the hostname has not been dynamically generated or associated with a particular advertiser.

A request for the advertisement is received from the client (step 250). The request includes the hostname of the reference (e.g., acme.adserver.example). In some implementations, the hostname portion of the reference is provided with client's request automatically (e.g., as required by the hypertext transfer protocol (HTTP/1.1)). In other implementations, the reference can be provided in the path of the requested content (e.g., 'http://acme.adserver.example/ad1.gif?q=acme').

If the ad server does not receive any other information with the request, the ad server provides the advertisement and an HTTP cookie to the client (step 260). The HTTP cookie is hereafter referred to as a client cookie. The client cookie includes a payload consisting of a unique identifier (e.g., a number). The ad server generates the unique identifier, which distinguishes the particular client cookie from other cookies associated with a same hostname. The ad server records the unique identifier and other information related to the request (e.g., the particular advertisement requested, the advertiser, the time and the publisher).

Typically, the client cookie is received, stored and associated with the generated hostname of the request by the client. Whenever the client makes a request that includes the generated hostname, the client cookie associated with the hostname is included in the request. Therefore, after having first received a client cookie with the unique identifier, the client provides the unique identifier in all subsequent requests that address the dynamically generated hostname. For example, the client cookie and its unique identifier is provided with a request for an advertisement addressed to the acme.adserver.example hostname. The unique identifier is not provided by the client when requesting an advertisement addressed to other hostnames, which are presumably associated with other advertisers. The ad server provides the client a distinct identifier for each cookie associated with each advertiser. Therefore, the client receives one identifier for acme.adserver.example and a completely different identifier for emca.adserver.example.

When a request is received from the client that includes the cookie and the unique identifier, a record of the request and the unique identifier is stored (step 270). In general, the ad server can also record other information related to the request.

The request records of multiple clients can be correlated based on each client's unique identifier to derive advertising metrics on a per-advertiser and per-client basis. The advertising metrics can measure how many distinct clients requested an advertiser's ads and how many times a particular client requested the ads of an advertiser.

In some implementations, the published content corresponds to a conversion page.

An advertisement or other content associated with the advertiser (e.g., a transparent image) can be referred to by the conversion page. In such implementations, advertising metrics can be used to determine how many advertisement requests by particular clients (e.g., from a page other than the conversion page) subsequently led to those clients requesting the conversion page. For example, different clients can view published content that includes a particular advertisement. Each retrieval of that specific advertisement can be logged. Additionally, if one or more of the clients select the advertisement (e.g., by clicking on the ad), then the client browser can display a particular conversion page associated with the advertisement. The instances in which a conversion page was accessed by the client can also be logged. Thus, the ad system can derive metrics indicative of advertisement effectiveness based on the ratio of advertisement retrieval to client requests of the corresponding conversion page.

In contrast to a single unique identifier associated with the ad server, advertising metrics cannot be used to aggregate advertising metrics of a client across the multiple advertisers associated with the ad server.

A client may be able to accept or reject cookies based on the advertiser the cookie is associated with. By allowing the client (and therefore the user of the client) to choose to block cookies on a per-advertiser basis, the user is afforded more control over their browsing preferences.

Figure 3:
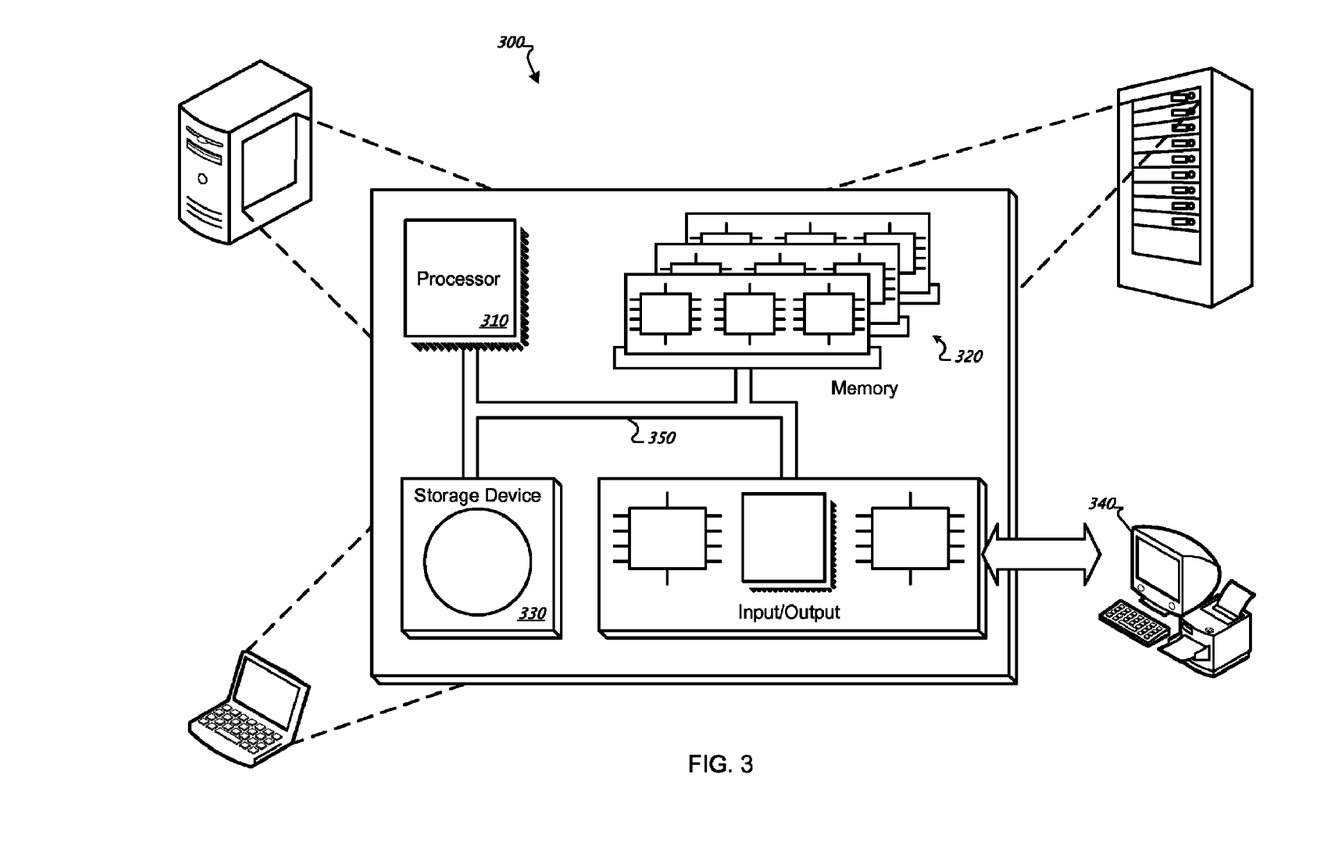
FIG. 3 is a schematic diagram of an example computer system.

FIG. 3 is a schematic diagram of an example computer system. The system 300 can be used for the operations described in association with the process 200 shown in FIG. 2 according to one implementation. For example, one or more of the systems 300 can be used to implement a server hosting a ad serving system.

The system 300 includes a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340. In some embodiments, a parallel processing set of systems 300 connected over a network may be employed, clustered into one or more server centers.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, or some other large capacity storage device.

The input/output device 340 provides input/output operations for the system 300. In one implementation, the input/output device 340 includes a keyboard and/or pointing device. In another implementation, the input/output device 340 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
storing multiple advertisements for multiple advertisers on an ad server, including storing a first advertisement for a first advertiser and a second advertisement for a different second advertiser;
generating, by the ad server, hostnames specific to each of the multiple advertisers, including generating a first-advertiser-specific hostname specific to the first advertiser and a different second-advertiser-specific hostname specific to the second advertiser, each of the generated hostnames identifying the ad server;
generating references that each identify a respective advertisement of the multiple advertisements and the ad server, the ad server being identified in each reference using the generated hostname specific to the advertiser of the respective advertisement, the references including a first reference that identifies the first advertisement and that identifies the ad server using the first-advertiser-specific hostname, the references further including a second reference that identifies the second advertisement and that identifies the ad server using the second-advertiser-specific hostname;
receiving on the ad server, from a client, a first request, the first request being a request for the advertisement identified by the first reference;
in response to the first request, determining from the first-advertiser-specific hostname in the first reference that the first request is associated with the first advertiser and sending to the client a first client cookie, the first client cookie including a unique first-advertiser-specific identifier, the identifier being specific to the first advertiser and to the client;
receiving on the ad server, from the client, a second request, the second request being a request for the advertisement identified by the second reference;
in response to the second request, determining from the second-advertiser-specific hostname in the second reference that the second request is associated with the second advertiser and sending to the client a second client cookie, the second client cookie including a unique second-advertiser-specific identifier, the identifier being specific to the second advertiser and to the client;
receiving a third request from the client, the third request including the first client cookie;
in response to the third request, recording the third request including the unique first-advertiser-specific identifier of the first client cookie; and
using the recorded third request to derive advertising metrics for the first advertiser.

2. The method of claim 1, further comprising:
recording request data for a plurality of requests, the request data for each request comprising an advertiser-specific hostname identifying a particular advertiser and an advertiser-specific identifier specific to a particular client and the particular advertiser; and
using the request data to derive advertising metrics.

3. The method of claim 1, further comprising:
providing the first reference to a publisher for the publisher to incorporate into published content to be provided to the client by the publisher.

4. The method of claim 1 wherein the first reference is a universal resource locator.

5. The method of claim 1, further comprising:
in response to the first and second request, sending to the client the advertisement requested by the client.

6. The method of claim 1, wherein the respective client cookie is sent by the client in all subsequent requests that include the respective advertiser-specific hostname.

7. The method of claim 1, further comprising identifying for the client the particular advertiser associated with a particular cookie and receiving a user input specifying whether or not the particular cookie from that particular advertiser is accepted.

8. A computer program product, encoded on a non-transitory computer-readable medium, comprising instructions operable to cause data processing apparatus to:
store multiple advertisements for multiple advertisers on an ad server, including storing a first advertisement for a first advertiser and a second advertisement for a different second advertiser;
generate hostnames specific to each of the multiple advertisers, including generating a first-advertiser-specific hostname specific to the first advertiser and a different second-advertiser-specific hostname specific to the second advertiser, each of the generated hostnames identifying the ad server;
generate references that each identify a respective advertisement of the multiple advertisements and the ad server, the ad server being identified in each reference using the generated hostname specific to the advertiser of the respective advertisement, the references including a first reference that identifies the first advertisement and that identifies the ad server using the first-advertiser-specific hostname, the references further including a second reference that identifies the second advertisement and that identifies the ad server using the second-advertiser-specific hostname;
receive on the ad server, from a client, a first request, the first request being a request for the advertisement identified by the first reference;
in response to the first request, determine from the first-advertiser-specific hostname in the first reference that the first request is associated with the first advertiser and sending to the client a first client cookie, the first client cookie including a unique first-advertiser-specific identifier, the identifier being specific to the first advertiser and to the client;
receive on the ad server, from the client, a second request, the second request being a request for the advertisement identified by the second reference;
in response to the second request, determine from the second-advertiser-specific hostname in the second reference that the second request is associated with the second advertiser and sending to the client a second client cookie, the second client cookie including a unique second-advertiser-specific identifier, the identifier being specific to the second advertiser and to the client;
receive a third request from the client, the third request including the first client cookie;
in response to the third request, record the third request including the unique first-advertiser-specific identifier of the first client cookie; and
use the recorded third request to derive advertising metrics for the first advertiser.

9. The program product of claim 8, further comprising instructions operable to cause data processing apparatus to:
record request data for a plurality of requests, the request data for each request comprising an advertiser-specific hostname identifying a particular advertiser and an advertiser-specific identifier specific to a particular client and the particular advertiser; and
use the request data to derive advertising metrics.

10. The program product of claim 8, further comprising instructions operable to cause data processing apparatus to:
provide the first reference to a publisher for the publisher to incorporate into published content, the published content to be provided to the client by the publisher.

11. The program product of claim 8, wherein the first reference is a universal resource locator.

12. The program product of claim 8, further comprising instructions operable to cause data processing apparatus to:
in response to the first and second request, send to the client the advertisement requested by the client.

13. The program product of claim 8, wherein the respective client cookie is sent by the client in all subsequent requests that include the respective advertiser-specific hostname.

14. The program product of claim 8, further comprising instructions operable to cause data processing apparatus to identify for the client the particular advertiser associated with a particular cookie and to receive a user input specifying whether or not the particular cookie from that particular advertiser is accepted.

15. A system comprising:
one or more computers and one or more storage devices storing instructions that are operable, when executed by the one or more computers, to cause the one or more computers to perform operations comprising:
storing multiple advertisements for multiple advertisers on an ad server, including storing a first advertisement for a first advertiser and a second advertisement for a different second advertiser;
generating hostnames specific to each of the multiple advertisers, including generating a first-advertiser-specific hostname specific to the first advertiser and a different second-advertiser-specific hostname specific to the second advertiser, each of the generated hostnames identifying the ad server;
generating references that each identify a respective advertisement of the multiple advertisements and the ad server, the ad server being identified in each reference using the generated hostname specific to the advertiser of the respective advertisement, the references including a first reference that identifies the first advertisement and that identifies the ad server using the first-advertiser-specific hostname, the references further including a second reference that identifies the second advertisement and that identifies the ad server using the second-advertiser-specific hostname;
receiving on the ad server, from a client, a first request, the first request being a request for the advertisement identified by the first reference;
in response to the first request, determining from the first-advertiser-specific hostname in the first reference that the first request is associated with the first advertiser and sending to the client a first client cookie, the first client cookie including a unique first-advertiser-specific identifier, the identifier being specific to the first advertiser and to the client;
receiving on the ad server, from the client, a second request, the second request being a request for the advertisement identified by the second reference;
in response to the second request, determining from the second-advertiser-specific hostname in the second reference that the second request is associated with the second advertiser and sending to the client a second client cookie, the second client cookie including a unique second-advertiser-specific identifier, the identifier being specific to the second advertiser and to the client;

receiving a third request from the client, the third request including the first client cookie;

in response to the third request, recording the third request including the unique first-advertiser-specific identifier of the first client cookie; and using the recorded third request to derive advertising metrics for the first advertiser.

16. The system of claim 15, the operations further comprising:

recording request data for a plurality of requests, the request data for each request comprising an advertiser-specific hostname identifying a particular advertiser and an advertiser-specific identifier specific to a particular client and the particular advertiser; and using the request data to derive advertising metrics.

17. The system of claim 15, the operations further comprising:

providing the first reference to a publisher for the publisher to incorporate into published content to be provided to the client by the publisher.

18. The system of claim 15, wherein the first reference is a universal resource locator.

19. The system of claim 15, the operations further comprising:

sending to the client the respective advertisement requested by the client in response to the first and second request.

20. The system of claim 15, wherein the respective client cookie is sent by the client in all subsequent requests that include the respective advertiser-specific hostname.

21. A computer implemented method, comprising:

storing content items associated with multiple entities on a server, including storing a first content item associated with a first entity and a second content item associated with a different second entity;

generating, by the server, hostnames specific to each of the multiple entities, including generating a first-entity-specific hostname specific to the first entity and a different second-entity-specific hostname specific to the second entity, each of the generated hostnames identifying the server;

generating references that each identify a particular content item and the server, the server being identified in each reference using the hostname generated specific to the entity associated with the particular content item, the references including a first reference that identifies the first content item and that identifies the server using the first-entity-specific hostname, the references further including a second reference that identifies the second content item and that identifies the server using the second-entity-specific hostname;

receiving on the server, from a client, a first request, the first request being a request for the content item identified by the first reference;

in response to the first request, determining from the first-entity-specific hostname in the first reference that the first request is associated with the first entity and sending to the client a first client cookie, the first client cookie including a unique first-entity-specific identifier, the identifier being specific to the first entity and to the client;

receiving on the server, from the client, a second request, the second request being a request for the content item identified by the second reference;

in response to the second request, determining from the second-entity-specific hostname in the second reference that the second request is associated with the second entity and sending to the client a second client cookie, the second client cookie including a unique second-entity-specific identifier, the identifier being specific to the second entity and to the client;

receiving a third request from the client, the third request including the first client cookie;

in response to the third request, recording the third request including the unique first-entity-specific identifier of the first client cookie; and using the recorded third request to derive content usage metrics for the first entity.

22. A system comprising:

one or more computers and one or more storage devices storing instructions that are operable, when executed by the one or more computers, to cause the one or more computers to perform operations comprising:

storing content items associated with multiple entities on a server, including storing a first content associated with a first entity and a second content item associated with a different second entity;

generating hostnames specific to each of the multiple entities, including generating a first-entity-specific hostname specific to the first entity and a different second-entity-specific hostname specific to the second entity, each of the generated hostnames identifying the server;

generating references that each identify a particular content item and the server, the server being identified in each reference using the hostname generated specific to the entity associated with the particular content item, the references including a first reference that identifies the first content item and that identifies the server using the first-entity-specific hostname, the references further including a second reference that identifies the second content item and that identifies the server using the second-entity-specific hostname;

receiving on the server, from a client, a first request, the first request being a request for the content item identified by the first reference;

in response to the first request, determining from the first-entity-specific hostname in the first reference that the first request is associated with the first entity and sending to the client a first client cookie, the first client cookie including a unique first-entity-specific identifier, the identifier being specific to the first entity and to the client;

receiving on the server, from the client, a second request, the second request being a request for the content item identified by the second reference;

in response to the second request, determining from the second-entity-specific hostname in the second reference that the second request is associated with the second entity and sending to the client a second client cookie, the second client cookie including a unique second-entity-specific identifier, the identifier being specific to the second entity and to the client;

receiving a third request from the client, the third request including the first client cookie;

in response to the third request, recording the third request including the unique first-entity-specific identifier of the first client cookie; and using the recorded third request to derive content usage metrics for the first entity.

23. A computer program product, encoded on a non-transitory computer-readable medium, the computer program product comprising instructions operable to cause data processing apparatus to perform operations comprising:
  storing content items associated with multiple entities on a server, including storing a first content associated with a first entity and a second content item associated with a different second entity;
  generating hostnames specific to each of the multiple entities, including generating a first-entity-specific hostname specific to the first entity and a different second-entity-specific hostname specific to the second entity, each of the generated hostnames identifying the server;
  generating references that each identify a particular content item and the server, the server being identified in each reference using the hostname generated specific to the entity associated with the particular content item, the references including a first reference that identifies the first content item and that identifies the server using the first-entity-specific hostname, the references further including a second reference that identifies the second content item and that identifies the server using the second-entity-specific hostname;
  receiving on the server, from a client, a first request, the first request being a request for the content item identified by the first reference;
  in response to the first request, determining from the first-entity-specific hostname in the first reference that the first request is associated with the first entity and sending to the client a first client cookie, the first client cookie including a unique first-entity-specific identifier, the identifier being specific to the first entity and to the client;
  receiving on the server, from the client, a second request, the second request being a request for the content item identified by the second reference;
  in response to the second request, determining from the second-entity-specific hostname in the second reference that the second request is associated with the second entity and sending to the client a second client cookie, the second client cookie including a unique second-entity-specific identifier, the identifier being specific to the second entity and to the client;
  receiving a third request from the client, the third request including the first client cookie;
  in response to the third request, recording the third request including the unique first-entity-specific identifier of the first client cookie; and
  using the recorded third request to derive content usage metrics for the first entity.

* * * * *